United States Patent

[11] 3,554,483

| [72] | Inventors | John J. Kuwik |
| | | Willoughby; |
| | | Thomas E. Stevenson, Willoughby Hills; |
| | | John J. Yagoda, Willowick, Ohio |
| [21] | Appl. No. | 792,062 |
| [22] | Filed | Jan. 1?, 1969 |
| [45] | Patented | Jan. 12, 1971 |
| [73] | Assignee | Bailey Meter Company |
| | | a corporation of Delaware |

[54] THRUST LIMITING SPRING COUPLING
6 Claims, 6 Drawing Figs.

| [52] | U.S. Cl. | 251/77 |
| [51] | Int. Cl. | F16k 35/04 |
| [50] | Field of Search | 251/77 |

[56] References Cited
UNITED STATES PATENTS

| 2,067,612 | 1/1937 | Loeffler | 251/77 |
| 3,236,256 | 2/1966 | Valentine | 251/77X |
| 3,342,451 | 9/1967 | Matousek | 251/77 |
| 3,389,886 | 6/1968 | Tissot-Dupont | 251/77X |

FOREIGN PATENTS

| 1,280,281 | 11/1961 | France | 251/77 |

Primary Examiner—Henry T. Klinksiek
Attorney—John F. Luhrs

ABSTRACT: A spring coupling device for a valve actuator assembly having a plurality of preloaded disc springs for absorbing an applied thrust above a predetermined amount to preclude distortion of the valve members to which the thrust is applied.

INVENTORS
JOHN J. KUWIK
THOMAS E. STEVENSON
JOHN J. YAGODA
BY
John F. Lukes
ATTORNEY

PATENTED JAN 12 1971 3,554,483

INVENTORS
JOHN J. KUWIK
THOMAS E. STEVENSON
JOHN J. YAGODA
BY
*John F. Luhrs*
ATTORNEY

3,554,483

THRUST LIMITING SPRING COUPLING

BACKGROUND OF THE INVENTION

1. Field of the Invention

The present invention relates generally to spring couplings, and, more particularly, to thrust limiting couplings for a valve actuator assembly.

The invention is particularly applicable to electrically operated valve actuators used for linearly positioning the plug within a valve and will be described with particular reference thereto, although it will be appreciated that the invention has broader applications such as in pneumatically and manually operated valve actuators.

2. Description of the Prior Art

Couplings for valve actuators of the type to which this invention pertains have ordinarily included a solid-block or split-sleeve type of coupling. The solid-block type of coupling included a mechanically rigid block with a threaded axial bore into which the ends of an actuator ram and valve stem were opposingly threaded. The axial thrust of the actuator ram was thus coupled to the valve stem.

The split-sleeve type coupling included essentially the same arrangement as above with the exception that the rigid block was axially split into two segments, each segment including a split half of the axial bore, and plurality of studs were used to clamp the half segments of the block together to rigidly couple the the actuator ram to the valve stem.

One of the principal problems of couplings of the above types is that it is possible to damage the valve by coupling too great a thrust to the valve stem from the actuator ram. This is a common problem since the final thrust output of the actuator ram, when a valve seats, depends in part upon the velocity at which the valve seat is approached, and the inertia of the moving parts cannot be overcome instantaneously.

The present invention contemplates a new and improved coupling which overcomes the above-referenced problems and others and provides a spring coupling which limits the thrust applied to the valve stem to a predetermined value.

SUMMARY OF THE INVENTION

In accordance with the present invention, there is provided in a valve actuator assembly, a spring coupling interposed between the valve actuator ram and the valve stem which comprises support means for a spring means adapted to be biased within the support means and preloading means for biasing the spring means a predetermined amount above valve operating thrust so that the spring means absorbs the applied ram thrust above the predetermined amount to preclude distortion of the valve assembly.

Further, in accordance with the invention, the preloading means includes means for adjusting the bias on the spring means and means for deflecting the spring means proportional to applied ram thrust exceeding the bias value on the spring means.

The principal object of the present invention is to provide a thrust limiting spring coupling to prevent damage to a valve actuator assembly.

Another object of this invention is to provide a preloaded spring coupling with an adjusting means for changing the preload value.

A further object of this invention is to provide a spring coupling which is simple in design, economical to manufacture and easy to replace.

DESCRIPTION OF THE PREFERRED EMBODIMENTS

Figure 2:
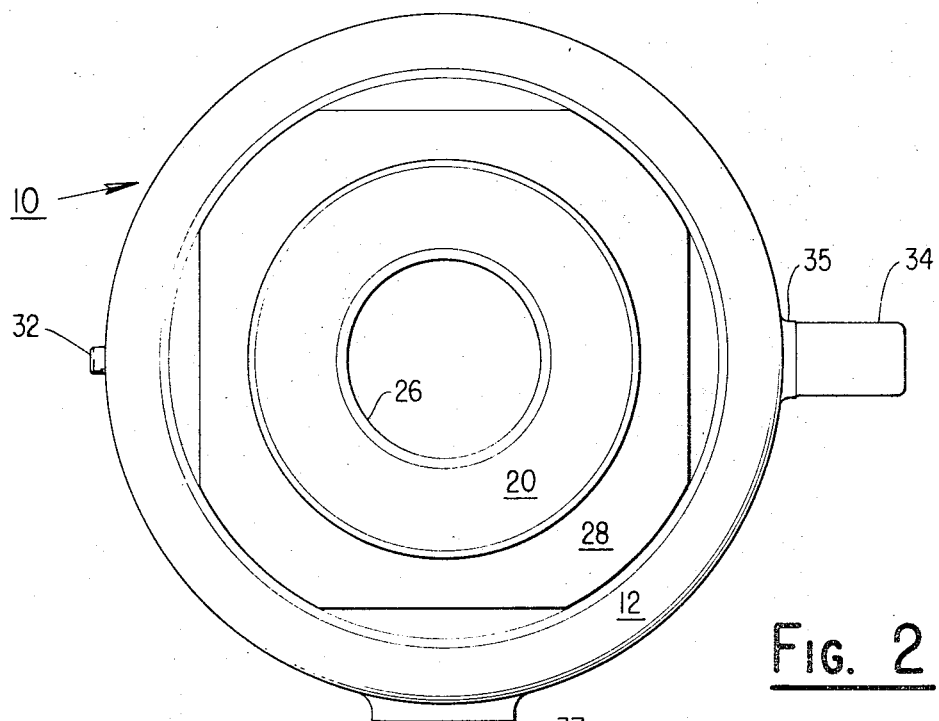
FIG. 2 is a plan view of the coupling FIG. 1.
Figure 1:
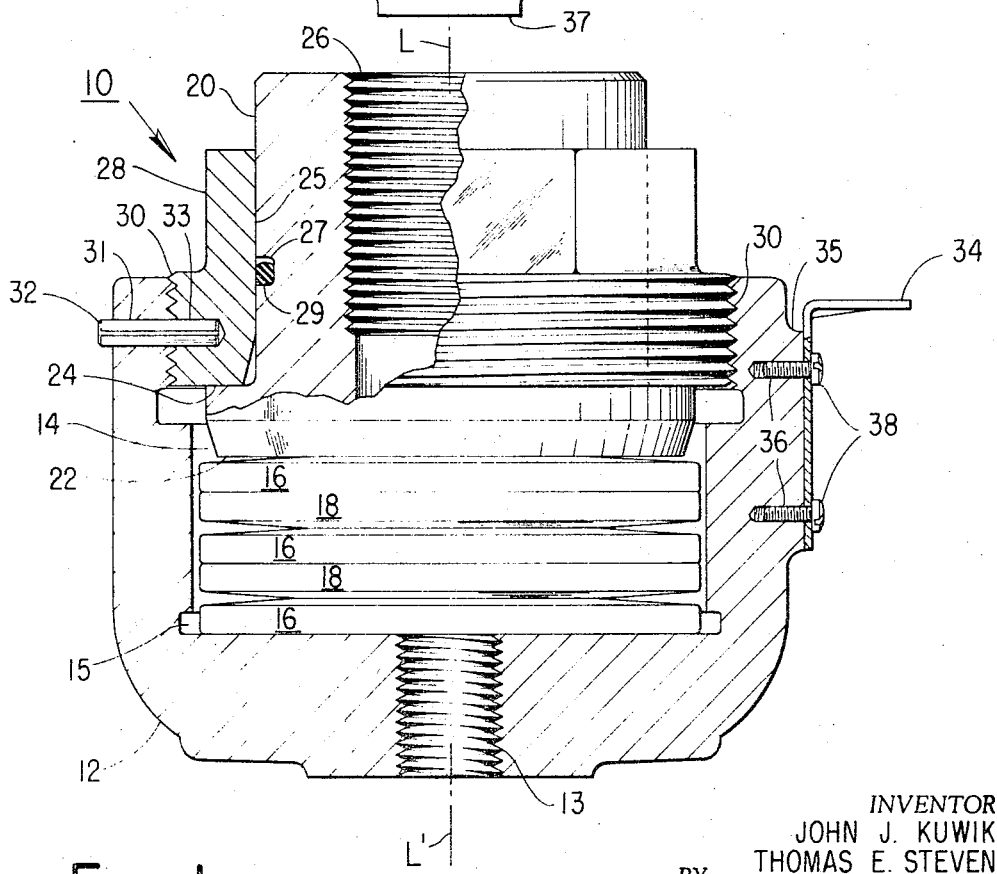
FIG. 1 is a partial section elevational view illustrating a thrust limiting spring coupling for downwardly closing valves.

Referring now to the drawings wherein the showings are for the purposes of illustrating the preferred embodiments of the invention only and not for the purposes of limiting same, FIGS. 1 and 2 illustrate a thrust limiting spring coupling for downwardly closing valves. The spring coupling 10 comprises a support housing 12 in which a plurality of disc springs 16, 18 are prebiased along the thrust axis L-L' by a reciprocating member 20 which is retained within the support housing 12 by a preloading member 28.

The support housing 12 includes a threaded bore 13 having an axis common with the thrust axis L-L' and is adapted to secure the support housing 12 to a threaded end of a valve stem. The support housing 12 has a cylindrical interior space 14 have having a cylindrical axis common to the thrust axis L-L'. Disc springs 16, 18, having a compression axis common to the thrust axis L-L', are supported by the housing 12 within the cylindrical space 14. The cylindrical space 14 has a diameter which is greater than the diameter of the disc springs 16, 18 in order to provide clearance between the interior of housing 12 and the periphery of the disc springs 16, 18. An annular groove 15 is provided in the housing 12 at one end of the cylindrical space 14 in order to provide a relief and to provide a surface perpendicular to the thrust axis L-L' for proper seating of the disc springs 16, 18.

The disc springs 16, 18 are of the type having a relatively low deflection corresponding to a relatively high loading characteristic and these disc springs are more commonly known in the trade as Schnor disc springs or Beleville washers. A typical range of spring constants for this type of disc spring may range from 10,000—50,000 pounds per inch of deflection, and it should be understood that for any particular spring chosen, the characteristic is to be substantially a straight line function from a preload deflection to 75 percent of maximum deflection. The arrangement of the disc springs 16, 18 in FIG. 1 is a mechanical series arrangement since any contiguous pair of springs are symmetrical to their interface surface. A mechanical parallel arrangement of the springs may also be used wherein two or more like oriented springs 18 are opposed by two or more like oriented springs 16, the interface between unlike oriented springs forming a plane of symmetry for the combination. The mechanical parallel arrangement doubles the spring constant for the particular disc springs used. It should also be recognized that other types of springs may also be used advantageously.

In FIG. 1, the disc springs 16, 18 are initially compressed or preloaded a predetermined amount by fixing the vertical position of the support housing 12 and applying the preload value of force along L-L' to the reciprocating member 20. The deflection of the disc springs 16, 18 is proportional to the value of applied force, and the amount of deflection fixes the position of the preloading shoulder 24 of the reciprocating member 20. The preloading member 28 is then movably secured to the support housing 12 by screwing preloading member 28 into the support housing 12 by means of screw threads 30 until contact is made with the preloading shoulder 24. The force applied to reciprocating member 20 is then removed, and the disc springs 16, 18 are maintained at the preloaded value under the contact face 22 of reciprocating member 20.

The preloading member 28 may be locked to the support housing 12 by means of a pin 32 inserted through the aligned pin holes 31, 33. The pin holes 31, 33 are formed by drilling through the assembled support housing 12 and preloading member 28 respectively in order to insure that the correct preloaded value of bias is on the disc springs 16, 18. An indicator platform 35 is formed parallel to the thrust axis L-L' on one of the quadrant axes of the support housing 12 and a positioner platform 37, 90 90° displaced with respect to the indicator platform 35, is also formed parallel to the thrust axis L–L'. The indicator platform 35 presents a flat surface to a vertical indicator member 34 which is fastened to the support housing 12 by means of mounting screws 38 threaded into the support housing 12 at 36. A position feedback indicator is similarly secured to positioner platform 37 and is used to transmit the vertical position of the spring coupling 10 to an electric valve controller by means of a connecting member secured therebetween.

An annular groove 27 is provided within the sliding surface 25 of reciprocating member 20, and an O-ring seal 29 is retained therein in order to provide an effective seal to prevent moisture and other contaminants from entering the interior space 14 of the support housing 12.

Figure 3:
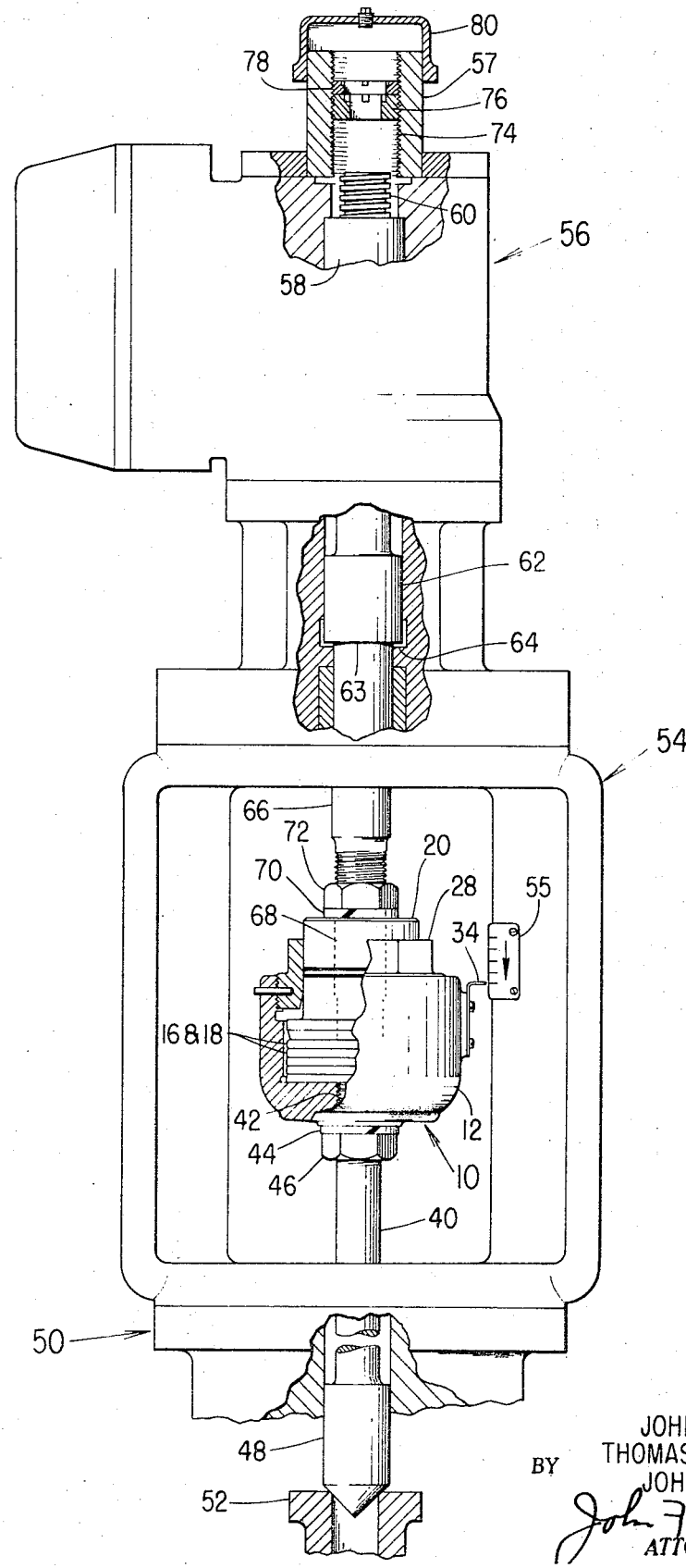
FIG. 3 is a partial section elevational view illustrating the coupling of FIGS. 1 and 2 in a valve actuator assembly.

Referring now to FIG. 3 which illustrates the spring coupling 10 assembled in an electric valve actuator assembly, a valve stem 40, having end threads 42, is screwed into the threaded bore 13 in the support housing 12 and locked thereto by means of lockwasher 44 and lock nut 46. The valve stem 40 projects downwardly and terminates in a valve plug 48 adapted to be seated in a downwardly closing valve seat 52 of valve assembly 50. A yoke 54 is vertically supported by the valve assembly 50 and in turn vertically supports an actuator drive mechanism 56. It should be understood that a vertical reference has been chosen for reference purposes only and that the valve actuator assembly may be oriented as conditions require.

The actuator drive mechanism includes a means for vertically displacing the valve plug 48 into the valve seat 52 and may take the form of a ball screw 60 threaded into a stationary ball nut 58 fixed within a drive passage 57. The shaft carrying the ball screw 60 also serves as the actuator ram 66. The ball screw shaft has a sleeve member 62 which has a diameter slightly greater than the thread diameter of the ball screw 60. An annular shoulder 63 is thus formed along the peripheral surface of the actuator ram 66 and is used to engage a fixed stop 64 within the drive passage 57 to limit the maximum vertical displacement of the actuator ram 66. The end of the actuator ram 66 is threaded at 68 and screwed into the threaded bore 26 of the reciprocating member 20. A lock washer 70 and lock nut 72 are used to lock the actuator ram 66 to the spring coupling assembly 10. An adjustable stop arrangement is provided at the opposite end of the drive passage 57 in order to limit the vertical upward travel of the ball screw 60 and hence, the ram actuator 66. The interior of the drive passage 57 is threaded at 74 to receive a threaded adjustable stop 76 and threaded lock member 78 for this purpose. An end cap 80 is secured to the end of the drive passage 57 in order to seal the system.

The operation of the valve actuator assembly illustrated in FIG. 3 is essentially the following series of events. The actuator drive mechanism 56 propels the ball screw 60 downwardly within the limit of the fixed stop 64, and hence, the actuator ram 66 applies this thrust to the spring coupling 10 and the valve stem 40 to seat the valve plug 48 in valve seat 52. The ram thrust is directly coupled to the valve plug 48 until the valve plug 58 is seated in the valve seat 52 at which time the indicator member 34, which is a part of the spring coupling 10, indicates on indicator plate 55, fastened to yoke 54, that the valve plug 48 has been seated. This condition corresponds to the indicator member 34 at the lowest vertical graduation of indicator plate 55. If, at this time, the ram thrust applied by the actuator ram 66 is greater than the preloaded bias value on disc springs 16, 18, this additional thrust will cause the deflection of disc springs 16, 18 to proceed downwardly so as to absorb the additional ram thrust above the preloaded value. This deflection of the springs allows the actuator ram 66 to travel an additional distance until the annular shoulder 63 engages the fixed stop 64. At this point, the maximum allowable valve stem load will not be exceeded while the valve seat 52 is maintained at a predetermined maximum value, thus eliminating distortion or fracture to the valve stem 40 or to any portion of the valve assembly 50.

Figure 5:
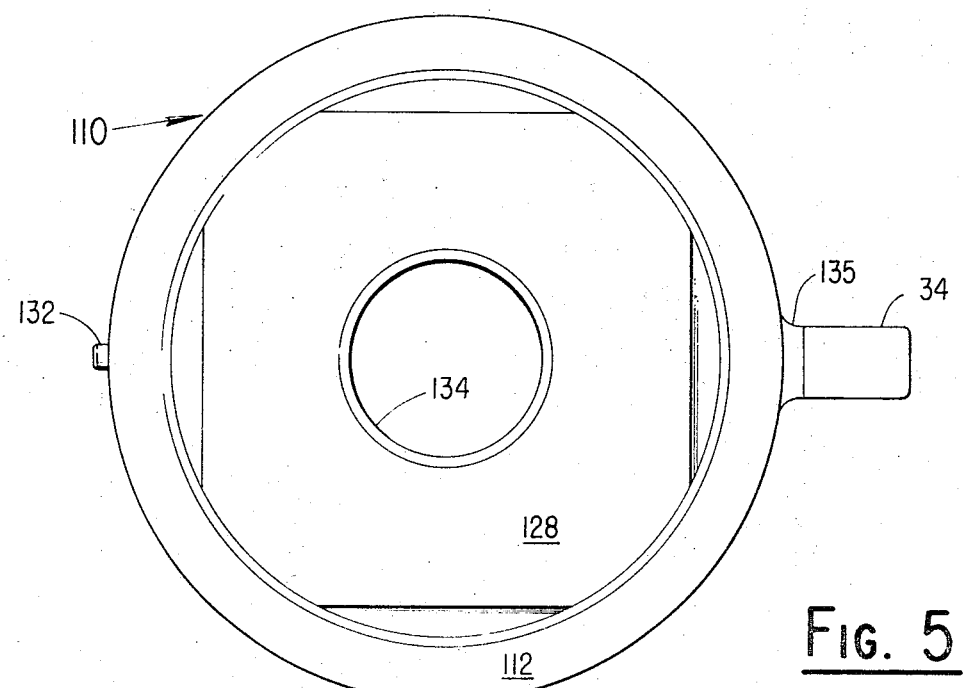
FIG. 5 is a plan view of the coupling of FIG. 4.
Figure 4:
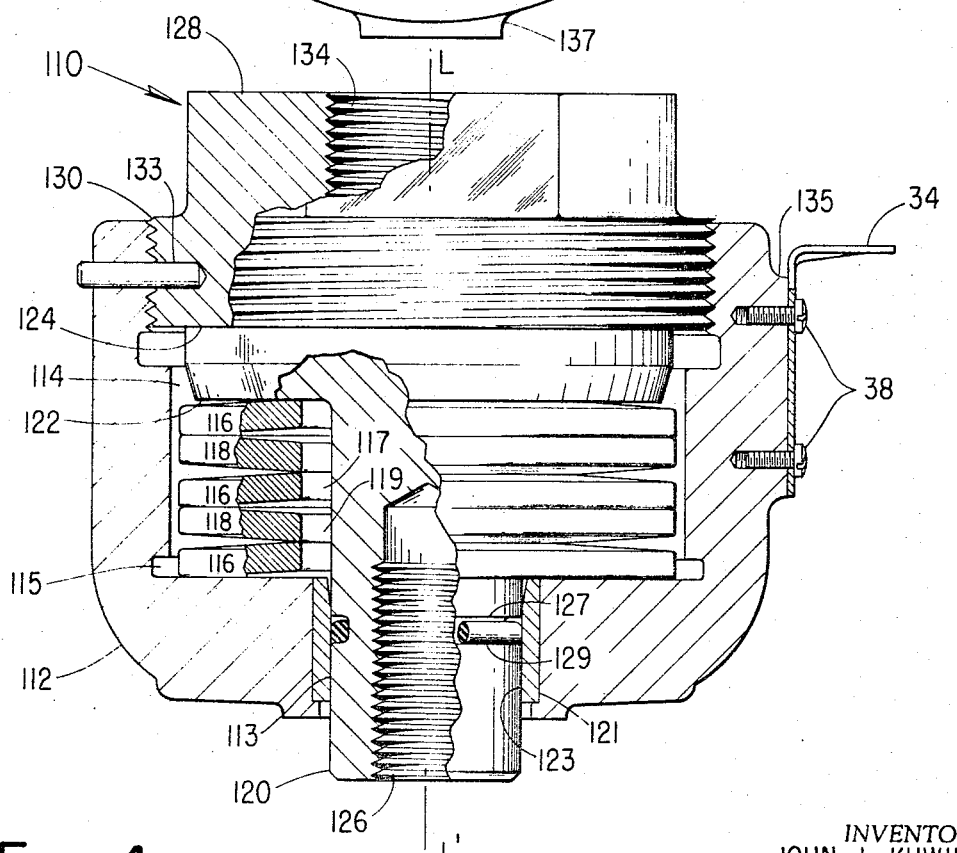
FIG. 4 is a partial section elevational view illustrating a thrust limiting spring coupling for upwardly closing valves.

Referring now to FIGS. 4 and 5, a thrust limiting spring coupling 110 for upwardly closing valves is illustrated and includes a support housing 112 of slightly different design than that shown in FIGS. 1 and 2. SUPPORT HOUSING Support housing 112 includes a cylindrical space 114 terminated by an annular space 115 of slightly larger diameter for the accommodation of disc springs 116, 118 concentric with the thrust L–L'. A bore 113, having a diameter appreciably smaller than the diameter of disc springs 116, 118, is provided along the thrust axis L–L' through the support housing 112 and is adapted to receive and retain an annular bushing 121.

The disc springs 116, 118 are of the same general type specified for the earlier described spring coupling. The respective disc springs have concentrically located central apertures, 117, 119, respectively, through which the leg member of a T-shaped reciprocating member 120 is downwardly projected into the annular bushing 121. The reciprocating member 120 has a contact shoulder surface 122 which compressibly engages the topmost disc spring 116. Reciprocating member 120 has a preloading surface 124 which is adapted to come in contact with a preloading member 128.

After the reciprocating member 120 has been inserted through the disc springs 116, 118 and bushing 121, the support housing 112 is vertically fixed in position and a downward force is applied to the preloading surface 124. A preloading member 128, having a threaded bore 134 to receive the threaded spindle of an actuator ram, is in place above the support housing at this time, and the preloading force is applied through bore 134 directly to the preloading surface 124 of the reciprocating member 120. The preloading force will cause the disc springs 116, 118 to deflect an amount determined by the spring constant, and the threaded barrel 130 of the preloading member 128 is screwed into the associated receiving threads in spring housing 112 until contact is made at the preloading surface 124. The support housing 112 and preloading member 128 are then drilled at 131, 133, respectively, in order to receive the lock pin 132. An indicator platform 135 and a positioner platform 137 are disposed in a fashion similar to that arrangement stated for the embodiment of FIG. 1 and serve the same purpose.

The sliding surface 123, between reciprocating member 120 and the annular bushing 121, is sealed by means of an O-ring seal 129 retained in an annular groove 127 located in the reciprocating member 120. Reciprocating member 120 has a threaded bore 126 adapted to receive a similarly threaded end portion of the valve stem. The threaded bore 134 in preloading member 128 is adapted to receive the threaded end of the actuator ram.

Figure 6:
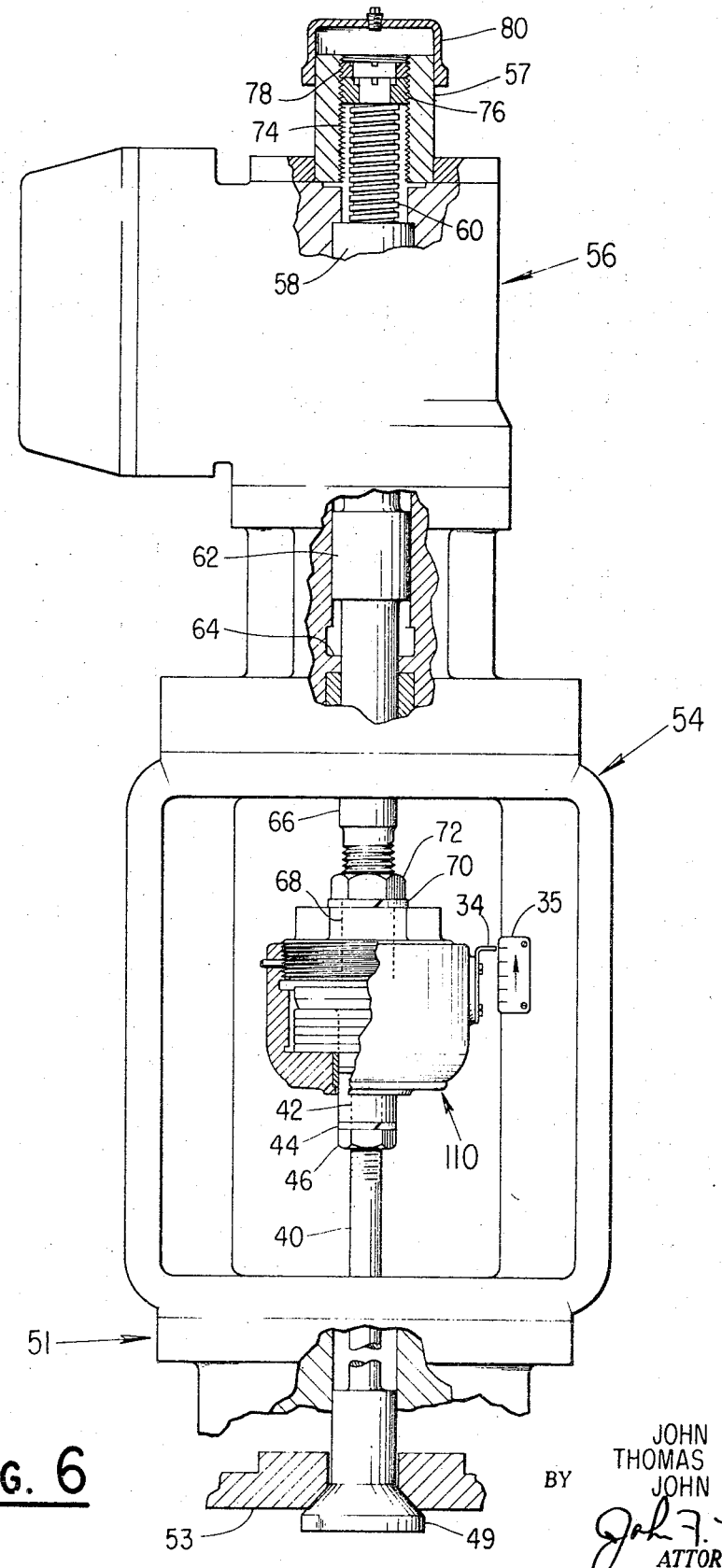
FIG. 6 is a partial section elevational view illustrating the coupling of FIGS. 4 and 5 in a valve actuator assembly.

Referring now to FIG. 6 the spring coupling 110, for upwardly seating valves, is shown in an electric valve actuator assembly. The arrangement shown is similar to that illustrated in FIG. 3 and identical parts are numbered accordingly. The valve assembly 51 in FIG. 6, however, includes an upwardly seating valve plug 49 and an upwardly seating valve seat 53. Another distinction is found in the reversal of functions of the fixed stop 64 and the adjustable stop 76. The arrangement in FIG. 6 utilizes the fixed step stop to limit the maximum downward travel of valve plug 49 and utilizes the adjustable stop 76 to limit the maximum upward displacement of the actuator ram 66. In FIG. 6, the position of indicator 34 is shown opposite the uppermost vertical graduation on indicator plate 35, and this is the indication for the valve plug 49 being seated in valve seat 53 due to the upward thrust of ram actuator 66 through spring coupling 110 and valve stem 40.

The operation of the spring coupling 110, illustrated in FIG. 6, is similar to that described for the operation of spring coupling 10 in FIG. 3 with the exception that here the actuator drive mechanism 56 drives the ball screw 60 upwardly in order to seat the valve plug 49 in valve seat 53, and the spring coupling 110 precludes the application of thrust to the valve assembly 51 above a predetermined maximum by shifting the support housing 112 upwardly to deflect the disc springs 116, 118. In contrast, the support housing 12 of spring coupling 10 remains stationary in order to compress the disc springs 16, 18 in order to preclude excessive thrust from being applied to the valve assembly 50.

It will be apparent that the embodiments shown are by way of example only and that various modifications can be made in construction and arrangement within the scope of the invention as defined in the appended claims.

We claim:

1. In a valve actuator assembly, a spring coupling interposed between the valve actuator ram and the valve stem, said coupling comprising:

support means forming an interior space symmetrical to the ram thrust axis;

spring means adapted to be biased within the interior space of said support means; and preloading means for biasing said spring means a predetermined amount above valve operating thrust so that said spring means absorbs the applied ram thrust above the predetermined amount to preclude distortion of the valve assembly.

2. The spring coupling of claim 1 wherein said preloading means includes both means for adjusting the bias on said spring means and means for deflecting said spring means proportional to the applied ram thrust exceeding the bias value on said spring means.

3. The spring coupling of claim 2 wherein said adjusting means has a passage having an axis common to the ram thrust axis and said deflecting means applies thrust to said spring means through the passage.

4. The spring coupling of claim 3 wherein said spring means includes a plurality of disc springs compressively retained between said preloading means and said support means.

5. The spring coupling of claim 2 wherein said support means has a passage communicating with the interior space, the passage having an axis common to the ram thrust axis and said deflecting means applies thrust to said spring means through the passage.

6. The spring coupling of claim 5 wherein said spring means includes a plurality of disc springs each having a centrally located aperture aligned with the thrust axis, said disc springs being compressively retained between said preloading means and said support means, said deflecting means being adapted to apply reciprocating thrust through the apertures in said disc springs.